Inventors
Edward F. Randolph
Nick Peteloki
By Charles E. [Schmidt]
Attorney

United States Patent Office 3,394,842
Patented July 30, 1968

3,394,842
PRESSURE RELEASE DEVICE FOR A HYDRAULIC TANK
Edward F. Randolph, Springfield, Ill., and Nick Petelski, Stillwater, Okla., assignors to Allis-Chalmers Manufacturing Company, Milwaukee, Wis.
Filed June 23, 1967, Ser. No. 648,319
4 Claims. (Cl. 220—86)

ABSTRACT OF THE DISCLOSURE

A pressure release device for a closed hydraulic tank having a trapped air chamber in its upper part which is automatically vented to the exterior of the tank upon partial removal of a cap for the tank. When the cap is removed, the vent passage is closed by a spring biased valve so that upon filling the tank with fluid the desired body of air will be trapped in the upper part of the tank. Illustrated is a vent tube disposed within the filler tube for the tank with a spring biased valve element in the vent tube which is moved to an open position by screwing the cap on the filler tube a predetermined extent. Partial removal of the cap exposes a venting passageway in the cap whereby the air in the trapped air chamber and filler tube are allowed to escape so as to reduce the pressure in the tank and filler tube to atmospheric pressure to complete removal of the cap.

---

This invention relates to a pressure release device for a closed hydraulic tank whereby the trapped air space in the upper part of the tank is vented to the exterior of the tank during removal of the filler cap, and upon full removal of the cap the vent passage to the trapped air chamber is closed so that air will be trapped therein when the tank is filled either initially or in servicing.

In a closed hydraulic system the hydraulic tank customarily employs a trapped air chamber in its upper part usually achieved by use of a filler tube which extends downwardly into the tank a substantial distance. This trapped air is of sufficient quantity to allow the oil to expand due to heating or use of differential area hydraulic rams in the hydraulic system. When the filler cap is removed from the filler tube the compressed air will expand forcing the hydraulic fluid out of the filler tube. This is not only dangerous to operating personnel, but also results in loss of hydraulic fluid.

It is an object of this invention to provide an improved device for preventing the escape of hydraulic fluid from a closed hydraulic tank when the filler cap is removed.

It is a further object of this invention to prevent injury and loss of hydraulic fluid from a closed pressurized hydraulic tank employing a trapped air chamber by automatically venting the trapped air chamber to the exterior of the tank when the filler cap is partially removed.

It is a further object of this invention to provide a pressure release device as hereinbefore outlined wherein the vent passage between the trapped air chamber and the filler tube is automatically closed when the filler cap is removed whereby a volume of air will be trapped in the upper part of the tank whenever the tank is filled either initially or during servicing.

These and other objects and advantages of this invention will be apparent to those familiar with the art when the following description is read in conjunction with the drawings in which.

Figures 1, 2:
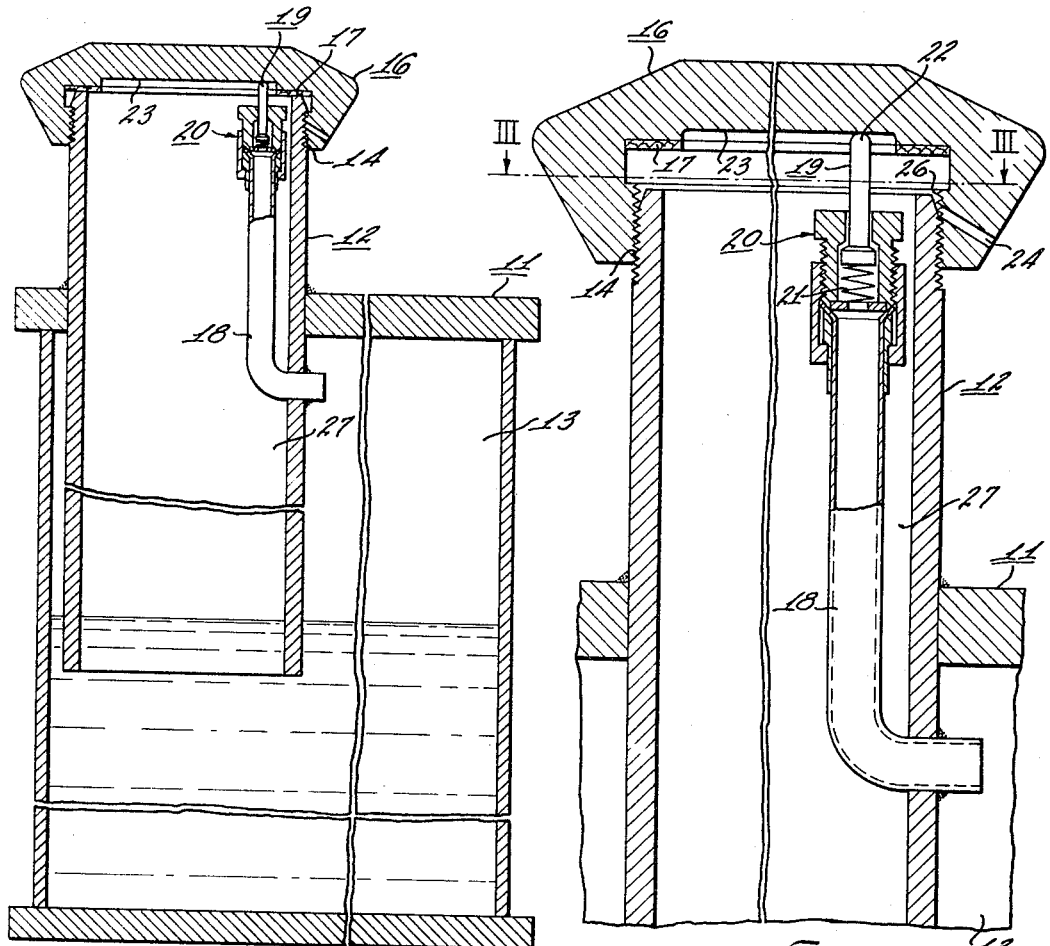
FIG. 1 is a section view of a hydraulic tank incorporating the pressure release device of the present invention.
FIG. 2 is an enlarged view of the pressure release device shown in FIG. 1 with the closure cap moved to its partially open position.
Figure 3:
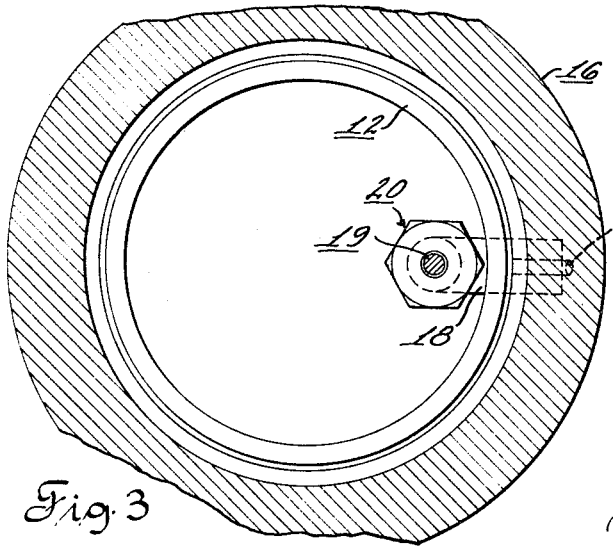
FIG. 3 is a section view taken along the line III—III in FIG. 2.

Referring to the drawings, the hydraulic tank 11 is of the closed type, however, it should be understood that appropriate fluid connections are employed with a pump and hydraulic control valve to permit fluid to be drawn from the tank and returned thereto. A filler tube member 12 is welded to the top wall of the tank and extends a substantial distance into the tank so as to insure the trapping of a volume of air in the upper part of the tank designated by reference character 13. The outer end of the filler tube member 12 is adapted by threads 14 to receive an internally threaded cap member 16 which may be removed to permit the addition of hydraulic fluid. During filling the hydraulic fluid will rise to approximately the level of the bottom end of tube member 12. When the cap member 16 is screwed to the filler member 12 to its closed position as illustrated in FIG. 1, wherein a gasket 17 sealingly engages the upper end of the filler tube member 16, the hydraulic tank will be ready to use for the purpose intended. For instance the hydraulic system in which the closed hydraulic tank is employed may be one employing differential area rams and thus during operation the quantity of fluid in the tank will vary. Also during operation the heat generated by the fluid will cause the air in tank to heat up and increase in pressure. A closed tank with air pocket may also be used in a hydraulic system wherein the tank is deliberately maintained at a predetermined pressure by appropriate regulating means.

In order to prevent the compressed air in the trapped air chamber 13 from pushing hydraulic fluid out the filler tube member when the cap member 16 is removed, a vent passage in the form of a vent tube 18 is provided which opens at its lower end into the trapped air chamber 13 near the top of the tank 11. The other end of the vent tube 18 is provided with a spring loaded valve 20 including valve element 19 biased to a closed position by coil spring 21. Valve element 19 has a thrust transmitting stem 22 in thrust transmitting relation to the inner top surface 23 of cap 16. Thus the surface 23 and stem 22 of valve element 19 constitute thrust transmitting means for holding the valve in an open position as shown in FIG. 1, wherein the cap member is in a closed position, and as shown in FIG. 2, wherein the cap member is in a partially open position.

Figure 4:
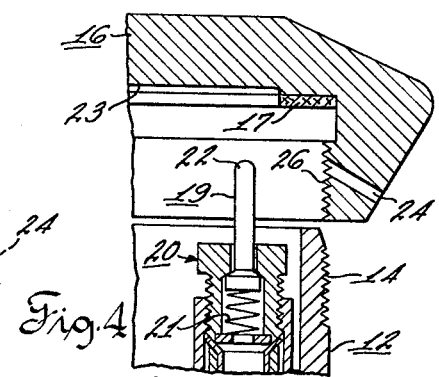
FIG. 4 is a section view showing the closure cap moved to its open position.

As shown in FIG. 2, adjustment of the cap to its partially open position exposes a vent passageway 24 in the cap member 16 which terminates in the interior area of the cap on which threads 26 are formed. This part of the cap is outside of the chamber 27 formed by the filler tube member 12 and the cap member 16 when the latter is in its sealed or closed position as shown in FIG. 1. By screwing the cap inwardly or outwardly from its position illustrated in FIG. 2, the air being vented from the upper part of the tank may be throttled so as to control its exit intensity. When the filler cap member 16 is moved to its open position, as shown in FIG. 4, the spring 21 will bias the valve element 19 to its illustrated closed position. In this position the tank may be initially filled with hydraulic fluid, or fluid may be added during servicing, and the air trapped in chamber 13 will not be permitted to escape, thus insuring the presence of the desired quantity of air in the tank.

From the foregoing description and on viewing the illustrations it will be apparent that a pressure release device has been provided for a closed hydraulic tank which permits the pressure in the tank, including the interior of the filler tube member, to be brought to atmospheric pressure so as to avoid spraying oil out through the filler tube when the cap is removed. As the releasably secured cap member is removed the air space in the top of the tank will be vented to atmosphere automatically through the valve 20 and vent passage 24 and upon complete removal of the cap, the valve 20 will seat permitting oil to be put into the tank without overfilling the system.

The embodiments of the invention for which an exclusive property or privilege is claimed are defined as follows:

1. A pressure release device for a hydraulic tank having a filler tube member with an outer end on the outside of the tank and an inner end terminating within said tank a substantial distance from the top thereof whereby a substantial volume of air may be trapped in the upper part of the tank, said device comprising:
   a vent passage between said upper part of said tank and the inside of said filler tube,
   a cap member releasably secured to said outer end of said filler tube member and movable between closed, partially open and open positions, and
   means closing said vent passage when said cap member is in its open position and venting the upper part of said tank through said vent passage and filler tube member when said cap is moved to its partially open position.

2. The structure set forth in claim 1 wherein said means includes a valve in said vent passage biased to a closed position which it occupies when said cap member is in its open position and wherein said valve is open when said cap member is in its closed and partially open positions.

3. The structure set forth in claim 2 wherein said means further includes thrust transmitting means between said valve and cap member holding said valve open when said cap member is in its closed or partially open positions.

4. The structure set forth in claim 3 wherein said means includes a passageway in one of said members which is blocked by the other of said members when said cap member is in its closed position, said passageway venting the interior of said filler tube member when said cap member is in its partially open position.

References Cited
UNITED STATES PATENTS

| | | | |
|---|---|---|---|
| 1,922,930 | 8/1933 | Darms | 220—86 |
| 1,928,569 | 9/1933 | Moreland | 220—86 |
| 2,346,313 | 4/1944 | Keller. | |
| 3,302,664 | 2/1967 | Plamann | 220—86 XR |

RAPHAEL H. SCHWARTZ, *Primary Examiner.*